(12) United States Patent
Qiao

(10) Patent No.: US 12,371,084 B2
(45) Date of Patent: Jul. 29, 2025

(54) DOUBLE-SLIDING SLEEVE COLLAPSIBLE FOLDING TRAILER

(71) Applicant: Jinhua Shanmu Leisure Products Co., LTD, Zhejiang (CN)

(72) Inventor: Chenfei Qiao, Jiangsu (CN)

( * ) Notice: Subject to any disclaimer, the term of this patent is extended or adjusted under 35 U.S.C. 154(b) by 336 days.

(21) Appl. No.: 18/299,581

(22) Filed: Apr. 12, 2023

(65) Prior Publication Data

US 2024/0294197 A1    Sep. 5, 2024

(30) Foreign Application Priority Data

Mar. 1, 2023 (CN) .......................... 202320351515.0

(51) Int. Cl.
*B62B 3/02* (2006.01)
*B62B 5/06* (2006.01)

(52) U.S. Cl.
CPC ................. *B62B 3/02* (2013.01); *B62B 5/067* (2013.01); *B62B 2205/06* (2013.01); *B62B 2205/20* (2013.01)

(58) Field of Classification Search
CPC ............................... B62B 3/02; B62B 2205/06
See application file for complete search history.

(56) References Cited

U.S. PATENT DOCUMENTS

| | | | |
|---|---|---|---|
| 1,919,103 A * | 7/1933 | Dolge | B62B 3/02 |
| | | | 280/640 |
| 11,332,178 B2 * | 5/2022 | Yang | B62B 5/067 |
| 11,685,416 B2 * | 6/2023 | Yang | B62B 3/025 |
| | | | 280/651 |
| 12,128,940 B2 * | 10/2024 | Sun | B62B 3/007 |
| D1,069,308 S * | 4/2025 | Wu | D34/12 |
| 12,263,876 B1 * | 4/2025 | Zhu | B62B 3/025 |
| 2021/0107548 A1 * | 4/2021 | Wang | B62B 3/007 |
| 2021/0107549 A1 * | 4/2021 | Wang | B62B 3/007 |
| 2021/0300449 A1 * | 9/2021 | Yang | B62B 3/025 |
| 2021/0300450 A1 * | 9/2021 | Yang | B62B 3/025 |
| 2022/0340183 A1 * | 10/2022 | Sun | B62B 3/025 |
| 2024/0010259 A1 * | 1/2024 | Luo | B62B 3/007 |
| 2024/0294197 A1 * | 9/2024 | Qiao | B62B 3/007 |
| 2024/0400120 A1 * | 12/2024 | Sun | B62B 3/025 |
| 2024/0400121 A1 * | 12/2024 | Sun | B62B 3/025 |
| 2025/0018989 A1 * | 1/2025 | Zhang | B62B 3/002 |
| 2025/0042458 A1 * | 2/2025 | Wu | B62B 3/025 |
| 2025/0042459 A1 * | 2/2025 | Wu | B62B 3/007 |

(Continued)

*Primary Examiner* — Erez Gurari

(57) ABSTRACT

The double-sliding sleeve collapsible folding trailer comprises: a vertical rod assembly, left and right side folding assemblies, a front and rear side folding assembly, a bottom supporting assembly and a wheel assembly; four vertical rods are provided in a rectangular distribution and fixed with upper retaining brackets and lower retaining brackets at both ends, and with linkage sliding sleeves for vertical free sliding; the left and right side folding assemblies, the front and rear side folding assembly and the bottom supporting assembly are provided with a linkage sliding sleeve respectively. The cross sliding sleeves of each folding assembly with the linkage sliding sleeves on the vertical rods, realize the linkage structure design of multi-sliding sleeves to effectively optimize the folding structure, significantly improve the smooth folding and unfolding process, achieve a larger unfolding capacity and a more compact folded state for convenient storage with smaller volume and height.

6 Claims, 8 Drawing Sheets

(56) References Cited

U.S. PATENT DOCUMENTS

| | | | |
|---|---|---|---|
| 2025/0065934 A1* | 2/2025 | Zhang | B62B 3/007 |
| 2025/0065935 A1* | 2/2025 | Zheng | B62B 3/02 |
| 2025/0083724 A1* | 3/2025 | Sun | B62B 5/065 |
| 2025/0083725 A1* | 3/2025 | Sun | B62B 5/067 |
| 2025/0083726 A1* | 3/2025 | Sun | B62B 5/065 |
| 2025/0136160 A1* | 5/2025 | Jiang | B62B 3/025 |

* cited by examiner

DOUBLE-SLIDING SLEEVE COLLAPSIBLE FOLDING TRAILER

1. TECHNICAL FIELD

The invention relates to the technical field of folding trailers and, in particular to a double-sliding sleeve collapsible folding trailer.

2. BACKGROUND ART

In daily life and production, it is frequently necessary to carry luggage or goods, and the carrying process often involves using trailer tools. The trailer is widely used in the transportation of goods because of its convenient and time-saving features, and to facilitate the storage of the trailer, folding trailers have appeared in the relevant technology.

For instance, the patent with application No. CN201811017282.0 provides a trailer with no extra height when folding, comprising fixed standpipes arranged at the front and rear end of the trailer, and front and rear folding components, side folding components, bottom folding components and handle components connected to the fixed standpipes.

This solution mainly folds the trailer by providing the front and rear folding assembly, side folding assembly, and bottom folding assembly, where the height of the trailer does not change after folding, thus ensuring that the height after folding is the same as the height at the time of use, to realize the purpose that the volume after folding is smaller than the volume of the existing trailer.

The main improvement point of the above solution lies in the folding height; the front and rear folding components and side folding components employed are all linkage folding structures, except for the four standpipes with a sliding sleeve, in which only the side folding components are equipped with a sliding sleeve, and the design of the sliding sleeve can improve the stability and smoothness of the folding structure.

Therefore, the solution described hereinabove was discovered that the folding process could be smoother, which needs to be optimized and improved.

3. SUMMARY OF THE INVENTION

The technical problem to be solved by the invention is to provide a double-sliding sleeve collapsible folding trailer for the above problem in the prior arts.

The invention follows the following technical solutions: a double-sliding sleeve collapsible folding trailer, wherein comprises:

a vertical rod assembly comprises four vertical rods in a rectangular distribution, and each vertical rod is fixed with upper retaining brackets at the upper end and lower retaining brackets at the lower end, with provided with linkage sliding sleeves for vertical free sliding.

The left and right side folding assemblies are provided in the direction of the left and right sides, between two vertical rods adjacent to the front and rear.

The left and right side folding assemblies comprise a first cross long pipe, a first cross short pipe, a first cross sliding pipe, a first cross sliding sleeve, a second cross long pipe, a second cross short pipe, a second cross sliding pipe and a second cross sliding sleeve; the upper end of the first cross long pipe is hinged to the upper retaining bracket of the front side vertical rod and the lower end is hinged to the lower end of the second cross long pipe, and the upper end of the second cross long pipe is hinged to the upper retaining bracket of the rear side vertical rod; the upper end of the first cross short pipe is hinged to the first cross long pipe, the lower end is hinged to the linkage sliding sleeve of the rear side riser, and the second cross sliding sleeve is provided in sliding socket connection with the first cross short pipe; the upper end of the second cross short pipe is hinged to the second cross long pipe, the lower end is hinged to the linkage sliding sleeve of the front side riser, and the first cross sliding sleeve is provided in sliding socket connection with the first cross short pipe; the first cross sliding pipe is cross-hinged with the first cross long pipe, the lower end of the first cross sliding pipe is hinged with the first cross sliding sleeve and the upper end is hinged with the upper end of the second cross sliding pipe; the second cross sliding pipe is cross-hinged with the second cross long pipe, the lower end of the second cross sliding pipe is hinged with the second cross sliding sleeve.

The front and rear side folding assembly is provided in the direction of both front and rear sides, between two vertical rods adjacent to the left and right, and the front and rear side folding assembly comprises a third cross long pipe, a third cross short pipe, a third cross slide sleeve, a fourth cross long pipe, a fourth cross short pipe and a fourth cross slide sleeve; the upper end of the third cross long pipe is hinged to the upper retaining bracket of the left side vertical rod and the lower end is hinged to the fourth cross sliding sleeve.

The upper end of the third cross long pipe is hinged to the third cross long pipe, the lower end is hinged to the linkage sliding sleeve of the left vertical rod, and the third cross sliding sleeve is provided in sliding socket connection with the third cross short pipe; the upper end of the fourth cross long pipe is hinged to the upper retaining bracket of the right side vertical rods, the lower end is hinged to the third cross sliding sleeve, and the fourth cross long pipe is cross hinged to the third cross long pipe; the upper end of the fourth cross short pipe is hinged to the fourth cross long pipe, the lower end is hinged to the linkage sliding sleeve of the right side vertical rod, and the fourth cross sliding sleeve is provided in sliding socket connection with the fourth cross short pipe.

The bottom supporting assembly comprises a supporting base and four bottom connecting rods; the supporting base is distributed in the center of a rectangle formed by the four vertical rods, and the four bottom connecting rods are distributed diagonally in the X-shape of the rectangle; one end of each bottom connecting rod is hinged to the supporting base and the other end is hinged to the lower retaining bracket of the corresponding vertical rod.

The wheel assembly comprises four rollers, and the rollers are provided at the bottom of the lower retaining bracket of each vertical rod.

Preferably, the double-sliding sleeve collapsible folding trailer further comprises the handle assembly; the handle assembly comprises a handle, a pull rod, a base and connecting rods, and the pull rod is provided vertically on the front side between the left and right vertical rods; the pull rod is provided with the handle at the upper end and the base at the lower end; the left and right sides of the base are hinged with the connecting rods, respectively; the left rod is hinged with the lower retaining bracket of the left side vertical rod, and the right connecting rod is hinged with the lower retaining bracket of the right side vertical rod.

Preferably, the pull rod is vertically extendable.

Preferably, the upper retaining bracket and the lower retaining bracket are both provided with socket jacks and are fixed to the vertical rod through the socket jacks.

Preferably, in the left and right side folding assemblies, the first cross long pipe is anterior-posterior symmetrical to the second cross long pipe, and the first cross short pipe is anterior-posterior symmetrical to the second cross short pipe; the first sliding pipe is anterior-posterior symmetrical to the second sliding pipe, and the first sliding sleeve is anterior-posterior symmetrical to the second sliding sleeve.

Preferably, in the front and rear side folding assembly, the third cross long pipe is left-right symmetrical with the fourth cross long pipe, the third cross short pipe is anterior-posterior symmetrical with the fourth cross short pipe, and the third cross sliding sleeve is left-right symmetrical with the fourth cross sliding sleeve.

Compared to the prior arts, the invention has the following advantages and beneficial effects:

The two cross-sliding sleeves in the left and right side folding assemblies and the front and rear side folding assembly, with the linkage sliding sleeves on the vertical rods, realize the linkage structure design of multi-sliding sleeves to effectively optimize the folding structure, significantly improve the smooth folding and unfolding process, achieve a larger unfolding capacity and a more compact folded state for convenient storage with smaller volume and height.

Additional aspects and advantages of the invention will be given in the following description partially and will become apparent partially from the following description or will be learned through the embodiment of the invention.

4. BRIEF DESCRIPTION OF ACCOMPANY DRAWINGS

To make the technical solutions provided by the invention more comprehensible, a further description of the invention is given below in combination with the attached drawings and embodiments, and the embodiments are exemplary and not the limitations of the scope of the disclosure. Apparently, the described drawings are merely some embodiments of the application rather than all the embodiments of the application. It should be understood that the application is not limited to the drawings described herein. Based on the drawings in the invention, all other drawings obtained by those of ordinary skill in the art without making creative labor fall within the scope of protection of the invention.

Figure 1:
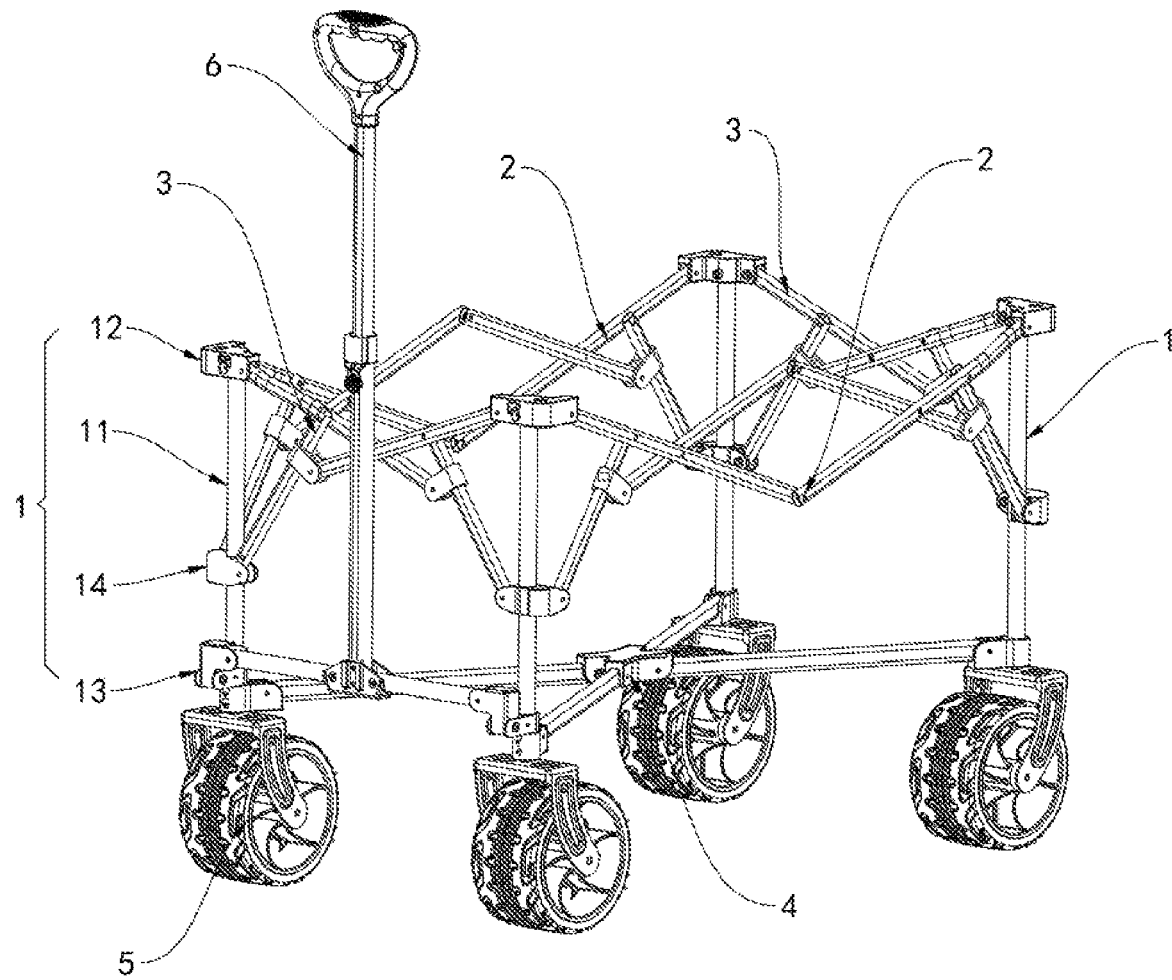
FIG. 1 is a schematic diagram showing the front side of the invention in three dimensions.

In the figures, 1. the vertical rod assembly; 11. the vertical rods; 12. the upper retaining brackets; 13. the lower retaining brackets; 14. the linkage sliding sleeves; 2. the left and right side folding assemblies; 21. the first cross long pipe; 22. the first cross short pipe; 23. the first cross sliding pipe; 24. the first cross sliding sleeve; 25. the second cross long pipe; 26. the second cross short pipe; 27. the second cross sliding pipe; 28. the second cross sliding sleeve; 3. the front and rear side folding assembly; 31. the third cross long pipe; 32. the third cross short pipe; 33. the third cross sleeve; 34. the fourth cross long pipe; 35. the fourth cross short pipe; 36. the fourth cross sleeve; 4. the bottom supporting assembly; 41. the supporting base; 42. the bottom connecting pipe; 5. the wheel assembly; 51. the rollers; 6. the handle assembly; 61. the handle; 62. the pull rod; 63. the base; 64. the connecting rods.

5. SPECIFIC EMBODIMENT OF THE INVENTION

To make the technical solutions provided by the invention more comprehensible, a further description of the invention is given below in combination with the attached drawings and embodiments, and the embodiments are exemplary and not the limitations of the scope of the disclosure. Apparently, the described drawings are merely some embodiments of the application rather than all the embodiments of the application. It should be understood that the application is not limited to the drawings described herein. Based on the drawings in the invention, all other drawings obtained by those of ordinary skill in the art without making creative labor fall within the scope of protection of the invention.

In the specification of the disclosure, it is to be understood that terms such as 'up', 'down', 'front', 'back', 'left', 'right', 'inside', 'outside', 'vertical', 'circumferential', 'radial', 'axial' refer to the orientations and location relations which are the orientations and location relations illustrated in the drawings, and for describing the disclosure and for describing in simple, and which are not intended to indicate or imply that the device or the elements are disposed to locate at the specific directions or are structured and performed in the specific directions, which could not to be understood to the limitation of the disclosure.

In the descriptions of the disclosure, terms such as 'first' and 'second' characteristics are used herein for purposes of description and are not intended to indicate or imply relative importance or significance or to imply the number of indicated technical features. Thus, the feature defined with 'first' and 'second' may comprise one or more of features.

In the descriptions of the disclosure, it should be noted that, unless otherwise specified or defined, the terms such as 'mount', 'provide', 'arrange' 'connect', and 'assemble' should be understood in a broad sense, for example, the connection may be a fixed connection, a detachable connection, or an integral connection; or the connection may be a mechanical connection, or may be an electrical connection or communication with each other; or the connection may be a direct connection, an indirect connection through an intermediary, or internal communication between two components or mutual interaction relationship between two components. The specific meanings of the above terms in the disclosure may be understood according to specific circumstances for a person of ordinary skill in the art.

Referring to the FIG. 1-FIG. 8, A double-sliding sleeve collapsible folding trailer, wherein comprises: a vertical rod assembly 1, left and right side folding assemblies 2, a front and rear side folding assembly 3, a bottom supporting assembly 4 and a wheel assembly 5.

Referring to the FIG. 1, a vertical rod assembly 1 comprises four vertical rods 11 in a rectangular distribution, and each vertical rod 11 is fixed with upper retaining brackets 13 at the upper end and lower retaining brackets 13 at the lower end, with provided with linkage sliding sleeves 14 for vertical free sliding.

Specifically, there are four vertical rods 11 in this device, which serve as the support frame of the trailer, and the four vertical rods 11 are distributed at the four vertices of the rectangle so as to define a rectangular vehicle body when unfolded for use.

Each of the vertical rods 11 is provided with a retaining bracket at the upper and lower ends, and the rods 11 are also provided with a linkage sliding sleeve 14 that can slide freely along the rods 11, and the linkage sliding sleeve 14 is located between the upper and lower retaining brackets.

In practical application, the upper retaining bracket 12 and lower retaining bracket 13 are provided with socket jacks, which can be used to form an interference fit to fix the outer sleeve on the vertical rods 11.

Figure 2:
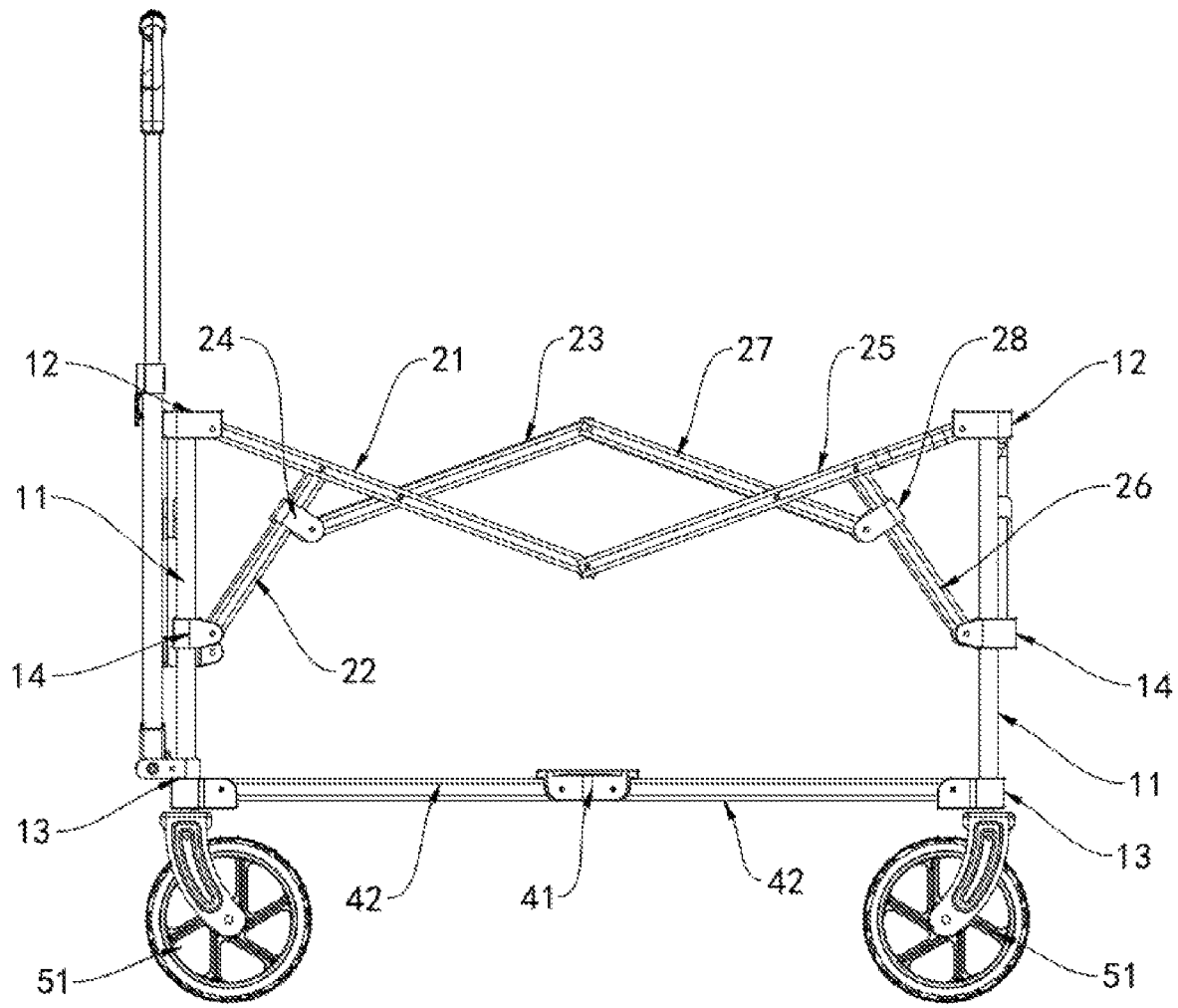
FIG. 2 is a schematic diagram showing the right side view of the invention.

Referring to the FIG. 1 and FIG. 2, left and right side folding assemblies 11 are provided in the direction of the left and right sides, between two vertical rods 11 adjacent to the front and rear. The left and right side folding assemblies 2 comprise a first cross long pipe 21, a first cross short pipe 22, a first cross sliding pipe 23, a first cross sliding sleeve 24, a second cross long pipe 25, a second cross short pipe 26, a second cross sliding pipe 27 and a second cross sliding sleeve 28; the upper end of the first cross long pipe 21 is hinged to the upper retaining bracket 12 of the front side vertical rod 11 and the lower end is hinged to the lower end of the second cross long pipe 25, and the upper end of the second cross long pipe 25 is hinged to the upper retaining bracket 12 of the rear side vertical rod 11.

The upper end of the first cross short pipe 22 is hinged to the first cross long pipe 21, the lower end is hinged to the linkage sliding sleeve 14 of the rear side riser, and the second cross sliding sleeve 14 is provided in sliding socket connection with the first cross short pipe 22; the upper end of the second cross short pipe 26 is hinged to the second cross long pipe 25, the lower end is hinged to the linkage sliding sleeve 14 of the front side vertical rod 11, and the second cross sliding sleeve 28 is provided in sliding socket connection with the second cross short pipe 26; the first cross sliding pipe 23 is cross-hinged with the first cross long pipe 21, the lower end of the first cross sliding pipe 23 is hinged with the first cross sliding sleeve 24 and the upper end is hinged with the upper end of the second cross sliding pipe 27; the second cross sliding pipe 27 is cross-hinged with the second cross long pipe 25, the lower end of the second cross sliding pipe 27 is hinged with the second cross sliding sleeve 28.

In this structure form, the cross-hinged first cross sliding pipe 23 and the first cross long pipe 21, and the cross-hinged second cross sliding pipe 27 and the second cross long pipe 25 will form two X-shaped connected folding structures;

When one of the X-shaped cross structure rotates, it will drive the other X-shaped cross structure to linkage, which can drive the sliding of the linkage sliding sleeve 14 and the sliding of the first cross sliding sleeve 24 and the second cross sliding sleeve 28 on the front and rear vertical rods 11, to realize that the front and rear vertical rods 11 moving closer to or farther away from each other.

The significance of the linkage structure is that whenever one of the parts operates, the other parts will follow, thus greatly improving the smoothness of the whole trailer folding and unfolding process.

Further, to guarantee the smoothness of folding and unfolding, in the left and right side folding assemblies 2, the first cross long pipe 21 is anterior-posterior symmetrical to the second cross long pipe 25, and the first cross short pipe 22 is anterior-posterior symmetrical to the second cross short pipe 26; the first sliding pipe 23 is anterior-posterior symmetrical to the second sliding pipe 27, and the first sliding sleeve 24 is anterior-posterior symmetrical to the second sliding sleeve 28.

Figure 3:
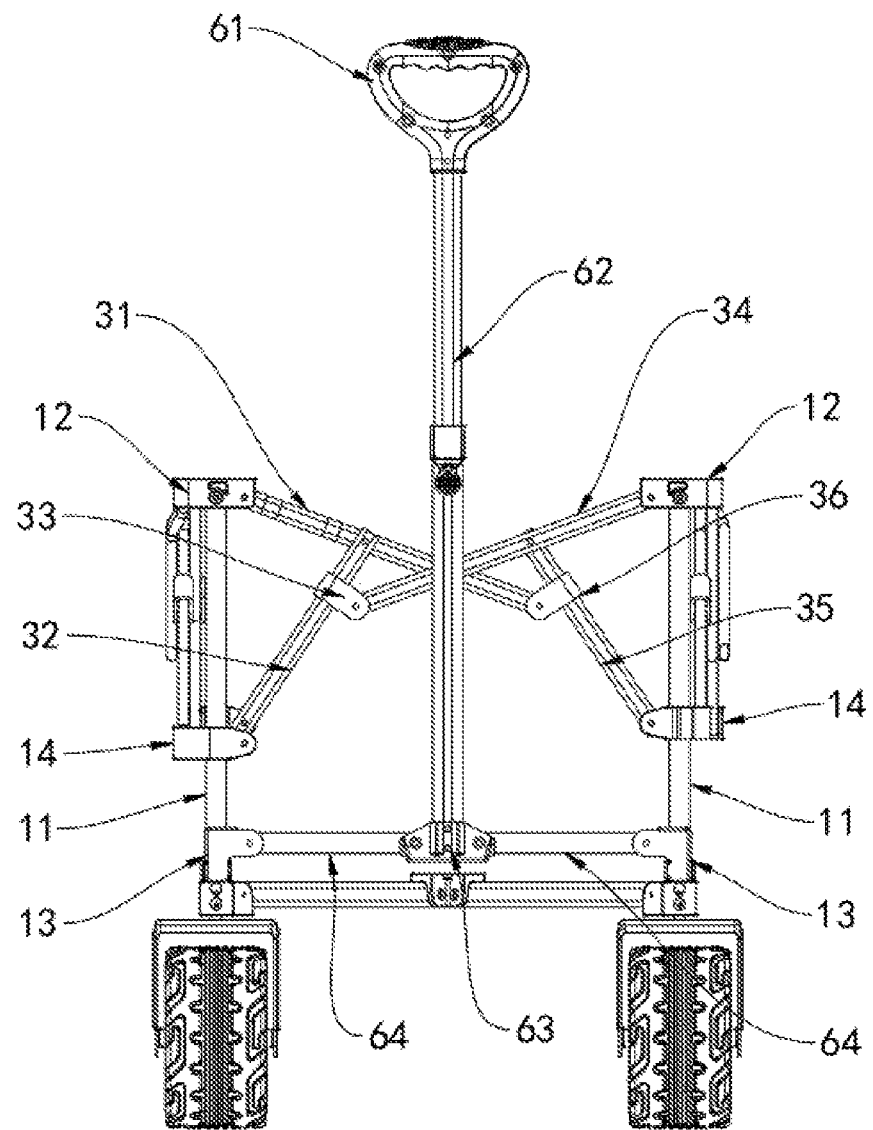
FIG. 3 is a schematic diagram showing the main view of the invention.

Referring to the FIG. 1 and FIG. 3, the front and rear side folding assembly 3 is provided in the direction of both front and rear sides, between two vertical rods 11 adjacent to the left and right, and the front and rear side folding assembly 3 comprises a third cross long pipe 31, a third cross short pipe 32, a third cross slide sleeve 33, a fourth cross long pipe 34, a fourth cross short pipe 35 and a fourth cross slide sleeve 36.

The upper end of the third cross long pipe 31 is hinged to the upper retaining bracket 12 of the left side vertical rod 11 and the lower end is hinged to the fourth cross sliding sleeve 36. The upper end of the third cross long pipe 32 is hinged to the third cross long pipe 31, the lower end is hinged to the linkage sliding sleeve 14 of the left vertical rod 11. The upper end of the fourth cross long pipe 34 is hinged to the upper retaining bracket 12 of the right side vertical rods 11, the lower end is hinged to the third cross sliding sleeve 33; the upper end of the fourth cross short pipe 35 is hinged to the fourth cross long pipe 34, the lower end is hinged to the linkage sliding sleeve 14 of the right side vertical rod 11. The fourth cross long pipe 34 is cross hinged to the third cross long pipe 31, and the fourth cross sliding sleeve 36 is provided in sliding socket connection with the fourth cross short pipe 35.

In this structure form, the cross-hinged intersection of the third cross long pipe 31 and the fourth cross long pipe 34 forms an X-shaped folding structure; when the X-shaped cross structure rotates, it will drive the third cross short pipe 32 and the fourth cross short pipe 35 to swing, which can drive the sliding of the linkage sliding sleeve 14 and the sliding of the third cross sliding sleeve 33 and the fourth cross sliding sleeve 36 on the left and right vertical rods 11, to realize the left and right vertical rods 11 to move closer or farther away from each other.

Further, to guarantee the smoothness of folding and unfolding, in the front and rear side folding assembly 3, the third cross long pipe 31 is left-right symmetrical with the fourth cross long pipe 34, the third cross short pipe 32 is anterior-posterior symmetrical with the fourth cross short pipe 35, and the third cross sliding sleeve 33 is left-right symmetrical with the fourth cross sliding sleeve 36.

Figure 4:
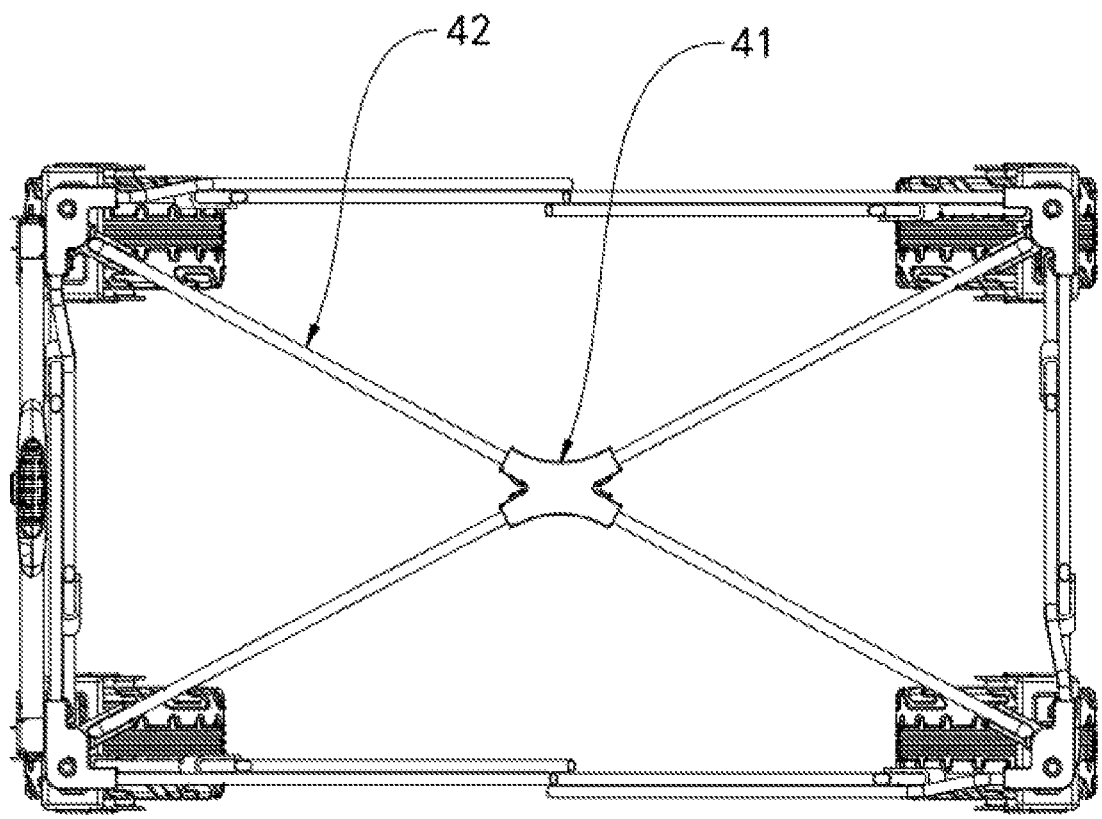
FIG. 4 is a schematic diagram showing the top view of the invention.

Referring to the FIG. 1 and FIG. 4, the bottom supporting assembly 4 comprises a supporting base 41 and four bottom connecting rods 42; the supporting base 41 is distributed in the center of a rectangle formed by the four vertical rods 11, and the four bottom connecting rods 42 are distributed diagonally in the X-shape of the rectangle; one end of each bottom connecting rod 42 is hinged to the supporting base 41 and the other end is hinged to the lower retaining bracket 13 of the corresponding vertical rod 11. Therefore, when the supporting base 41 is lifted upwards, the supporting base 41 will pull the four vertical rods 11 towards the center through the four bottom connecting pipes 42.

Referring to the FIG. 1, the wheel assembly comprises four rollers 51, and the rollers 51 are provided at the bottom of the lower retaining bracket 13 of each vertical rod 11.

Further, referring to the FIG. 1 and FIG. 4, the trailer further comprises the handle assembly 6; the handle assembly 6 comprises a handle 61, a pull rod 62, a base 63 and connecting rods 64, and the pull rod 62 is provided vertically on the front side between the left and right vertical rods 11; the pull rod 62 is provided with the handle 61 at the upper end and the base 63 at the lower end; the left and right sides of the base 63 are hinged with the connecting rods 64, respectively; the left connecting rod 64 is hinged with the lower retaining bracket 13 of the left side vertical rod 11, and the right connecting rod 64 is hinged with the lower retaining bracket 13 of the right side vertical rod 11. Therefore, when the pull rod 62 is moved up and down, the base 63 follows with the up and down movement, which will drive the left and right two vertical rods 11 towards each other closer or farther away through the two connecting rods 64.

In the practical application, the pull rod 62 is vertically extendable, which is more commonly applied in the prior art, including but not limited to a variety of trolley box, depending on the needs of the choice.

It should be noted that the two parts of A and B hinged as described herein, can be A and B are each provided with a pivot hole, and then use the pin through the two pivot holes to achieve the hinging of the two parts, to realize the simple application and easy implement.

Figure 5:
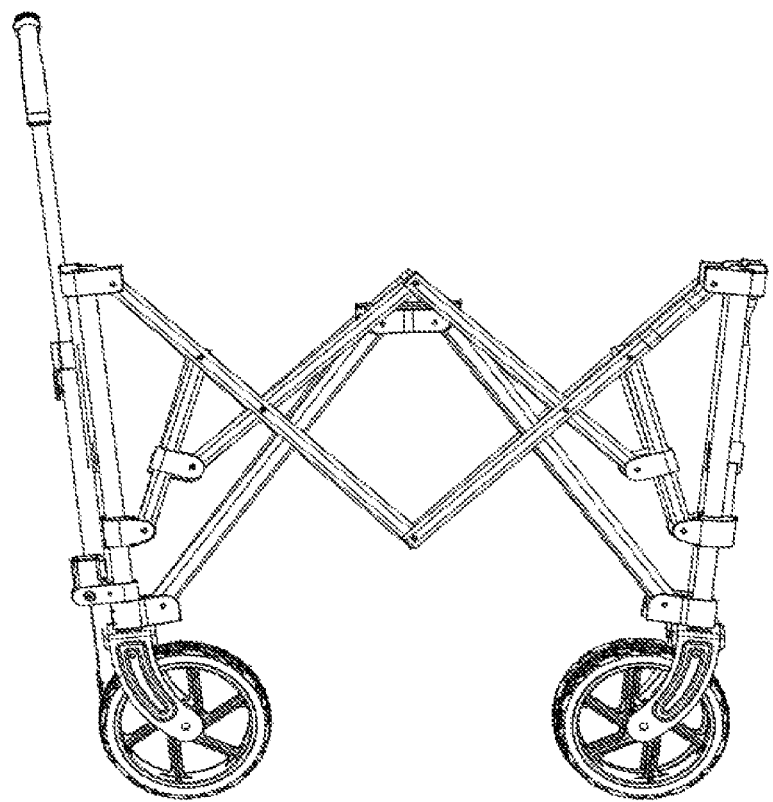
FIG. 5 is a schematic diagram showing the right side face of the invention in a semi-folded state.
Figure 6:
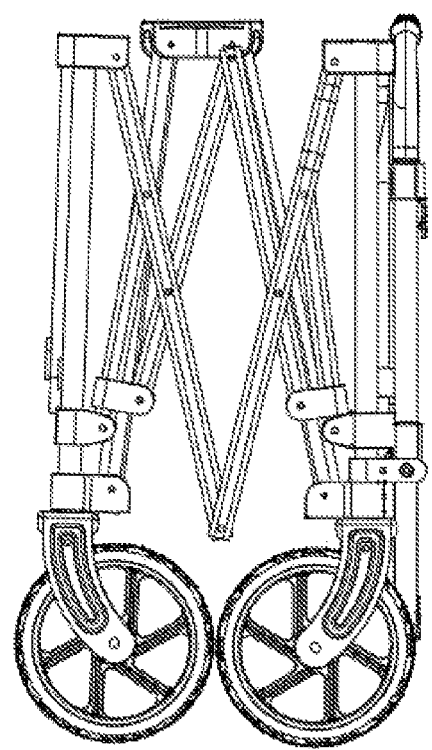
FIG. 6 is a schematic diagram showing the right side of the invention in a fully folded state.
Figure 7:
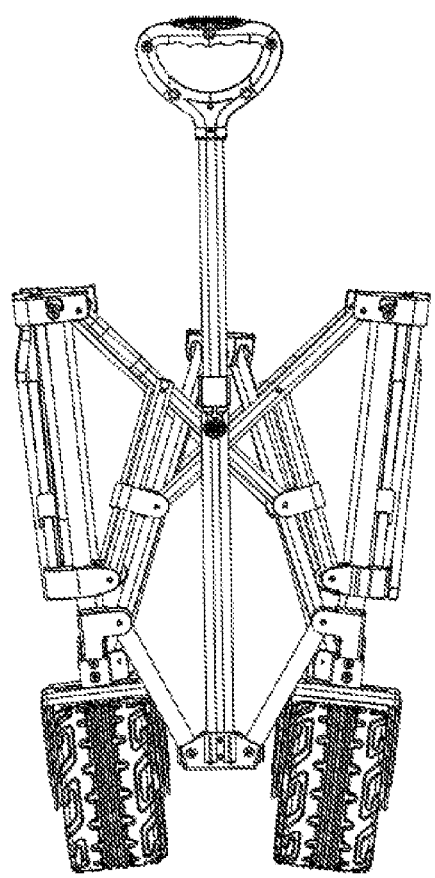
FIG. 7 is a schematic diagram showing the front side of the invention in a semi-folded state.
Figure 8:
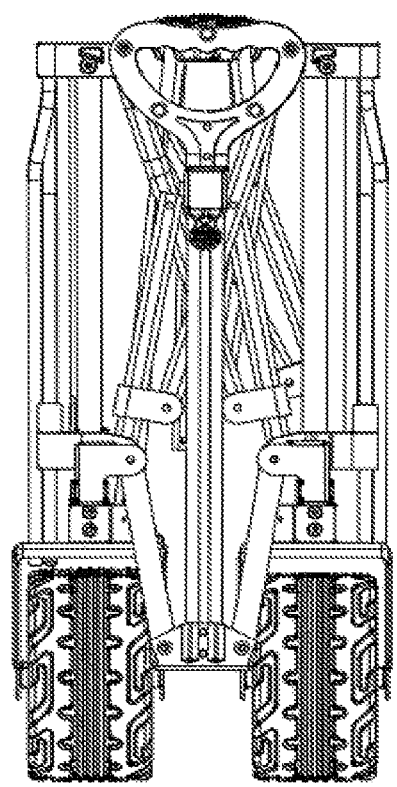
FIG. 8 is a schematic diagram showing the front side of the invention in a fully folded state.

The specific folding process of the invention is as follows:
1. When the trailer transforms from the unfolded state to the folded state when in operation, it is first necessary to lift up the supporting base 41 of the bottom supporting assembly 4. The supporting base 41 will then drive the four bottom connecting pipes 42 to rotate around the rotation axis at the hinge and close to each other and drive the four vertical rods 11 to close towards the center; and the linkage sliding sleeve 14 and the upper and lower retaining brackets 13 on each vertical rod 11 will follow the movement.
2. As shown in FIG. 5, for the folding of the left and right sides of the trailer, the two front and rear vertical rods 11 close together in the middle, the first cross long pipe 21 and the second cross long pipe 25 respectively rotate and fold downward around their respective rotation axes in the upper retaining bracket 12, and drive the first cross short pipe 22 and the linkage sliding sleeve 14 on the front vertical rod 11 to slide downward along the front vertical rod 11 for closing motion; at the same time, the second cross short pipe 26 and the linkage sliding sleeve 14 on the rear vertical rod 11 slide downward along the rear vertical rod 11 for closing movement, and then drive the first cross sliding sleeve 24 to slide along the first cross short pipe 22 and the second cross sliding sleeve 28 to slide along the second cross short pipe 26, and finally drive the first cross sliding pipe 23 and the second cross sliding pipe 27 to rotate and fold downward around the rotation axis, to realize the finally completion of the left and right side folding as shown in FIG. 6.
3. As shown in FIG. 7, for the folding of the front and rear sides of the trailer, the two left and right vertical rods 11 are brought closer to the middle, and the third crossed short pipe 32 and the fourth crossed short pipe 35 drive the linkage sliding sleeve 14 on the left and right vertical rods 11 to slide and fold downward along the respective vertical rods 11, and drive the third crossed long pipe 31, and the fourth crossed long pipe 34 to rotate, and fold downward around the respective rotation axis of the upper retaining bracket 12; and the third cross long pipe 31 and the fourth cross long pipe 34 are driven around their respective rotation axis in the upper retaining bracket 12 downward rotation folding, and then drive the third cross sliding sleeve 33 along the third cross short pipe 32 sliding and the fourth cross sliding sleeve 36 along the fourth cross short pipe 35 downward sliding for closing movement, to realize the finally completion of the mutual linkage folding as shown in FIG. 8.

Therefore, compared to the trailer in the prior art, the two cross-sliding sleeves in the left and right side folding assemblies and the front and rear side folding assembly, with the linkage sliding sleeves on the vertical rods, realize the linkage structure design of multi-sliding sleeves to effectively optimize the folding structure, significantly improve the smooth folding and unfolding process, achieve a larger unfolding capacity and a more compact folded state for convenient storage with smaller volume and height.

Although embodiments of the invention have been shown and described, it will be understood by those of ordinary skill in the art that a variety of variations, modifications, replacements and variants of these embodiments can be made without departing from the principles and spirit of the invention. Therefore, the protection scope of the invention should be subject to the protection scope defined by the claims and equivalents thereof.

The invention claimed is:
1. A double-sliding sleeve collapsible folding trailer, wherein comprises:
a vertical rod assembly comprises four vertical rods in a rectangular distribution, and each vertical rod is fixed with upper retaining brackets at the upper end and lower retaining brackets at the lower end, with provided with linkage sliding sleeves for vertical free sliding;
the left and right side folding assemblies are provided in the direction of the left and right sides, between two vertical rods adjacent to the front and rear;
the left and right side folding assemblies comprise a first cross long pipe, a first cross short pipe, a first cross sliding pipe, a first cross sliding sleeve, a second cross long pipe, a second cross short pipe, a second cross sliding pipe and a second cross sliding sleeve; the upper end of the first cross long pipe is hinged to the upper retaining bracket of the front side vertical rod and the lower end is hinged to the lower end of the second cross long pipe, and the upper end of the second cross long pipe is hinged to the upper retaining bracket of the rear side vertical rod; the upper end of the first cross short pipe is hinged to the first cross long pipe, the lower end is hinged to the linkage sliding sleeve of the rear side riser, and the second cross sliding sleeve is provided in sliding socket connection with the first cross short pipe; the upper end of the second cross short pipe is hinged to the second cross long pipe, the lower end is hinged to the linkage sliding sleeve of the front side riser, and the first cross sliding sleeve is provided in sliding socket connection with the first cross short pipe; the first cross sliding pipe is cross-hinged with the first cross long pipe, the lower end of the first cross sliding pipe is hinged with the first cross sliding sleeve and the upper end is hinged with the upper end of the second cross sliding pipe; the second cross sliding pipe is cross-hinged with the second cross long pipe, the lower end of the second cross sliding pipe is hinged with the second cross sliding sleeve;
the front and rear side folding assembly is provided in the direction of both front and rear sides, between two vertical rods adjacent to the left and right, and the front and rear side folding assembly comprises a third cross long pipe, a third cross short pipe, a third cross slide sleeve, a fourth cross long pipe, a fourth cross short pipe and a fourth cross slide sleeve; the upper end of the third cross long pipe is hinged to the upper retaining bracket of the left side vertical bar and the lower end is hinged to the fourth cross sliding sleeve; the upper end of the third cross long pipe is hinged to the third cross long pipe, the lower end is hinged to the linkage sliding sleeve of the left vertical rod, and the third cross sliding sleeve is provided in sliding socket connection with the third cross short pipe; the upper end of the fourth cross long pipe is hinged to the upper retaining bracket of the right side vertical rods, the lower end is hinged to the third cross sliding sleeve, and the fourth cross long pipe is cross hinged to the third cross long pipe; the upper end of the fourth cross short pipe is hinged to the fourth cross long pipe, the lower end is hinged to the linkage sliding sleeve of the right side vertical rod, and the fourth cross sliding sleeve is provided in sliding socket connection with the fourth cross short pipe;

the bottom supporting assembly comprises a supporting base and four bottom connecting rods; the supporting base is distributed in the center of a rectangle formed by the four vertical rods, and the four bottom connecting rods are distributed diagonally in the X-shape of the rectangle; one end of each bottom connecting rod is hinged to the supporting base, and the other end is hinged to the lower retaining bracket of the corresponding vertical rod;

the wheel assembly comprises four rollers, and the rollers are provided at the bottom of the lower retaining bracket of each vertical rod.

2. A double-sliding sleeve collapsible folding trailer according to claim 1, wherein further comprises the handle assembly; the handle assembly comprises a handle, a pull rod, a base and connecting rods, and the pull rod is provided vertically on the front side between the left and right vertical rods; the pull rod is provided with the handle at the upper end and the base at the lower end; the left and right sides of the base are hinged with the connecting rods, respectively; the left rod is hinged with the lower retaining bracket of the left side vertical rod, and the right connecting rod is hinged with the lower retaining bracket of the right side vertical rod.

3. A double-sliding sleeve collapsible folding trailer according to claim 2, wherein the pull rod is vertically extendable.

4. A double-sliding sleeve collapsible folding trailer according to claim 1, wherein the upper retaining bracket and the lower retaining bracket are both provided with socket jacks and are fixed to the vertical rod through the socket jacks.

5. A double-sliding sleeve collapsible folding trailer according to claim 1, wherein in the left and right side folding assemblies, the first cross long pipe is anterior-posterior symmetrical to the second cross long pipe, and the first cross short pipe is anterior-posterior symmetrical to the second cross short pipe; the first sliding pipe is anterior-posterior symmetrical to the second sliding pipe, and the first sliding sleeve is anterior-posterior symmetrical to the second sliding sleeve.

6. A double-sliding sleeve collapsible folding trailer according to claim 1, wherein in the front and rear side folding assembly, the third cross long pipe is left-right symmetrical with the fourth cross long pipe, the third cross short pipe is anterior-posterior symmetrical with the fourth cross short pipe, and the third cross sliding sleeve is left-right symmetrical with the fourth cross sliding sleeve.

* * * * *